(12) United States Patent
Christ-Janer

(10) Patent No.: US 6,702,583 B1
(45) Date of Patent: Mar. 9, 2004

(54) YANG-YIN EMBLEM

(76) Inventor: Victor Christ-Janer, 77 Frogtown Rd., New Canaan, CT (US) 06840

( * ) Notice: Subject to any disclaimer, the term of this patent is extended or adjusted under 35 U.S.C. 154(b) by 230 days.

(21) Appl. No.: 09/394,722

(22) Filed: Sep. 13, 1999

(51) Int. Cl.⁷ .................................................. G09B 19/00
(52) U.S. Cl. ............................................. 434/245; 428/3
(58) Field of Search ......................... 434/245; D99/25; D11/95, 97, 98, 99, 131, 132, 151, 152, 154, 75, 76, 79; 428/3; 63/23

(56) References Cited

U.S. PATENT DOCUMENTS

| | | | | |
|---|---|---|---|---|
| D151,554 S | * | 6/1948 | Philippe | D11/75 |
| D155,319 S | * | 9/1949 | Philippe | D11/75 |
| 4,184,685 A | * | 1/1980 | Wilson | 273/241 |
| 4,204,357 A | * | 5/1980 | Harrington | 446/47 |
| 4,953,864 A | * | 9/1990 | Katz | 273/161 |
| 5,203,564 A | * | 4/1993 | Bruzas | 273/161 |
| 5,409,234 A | * | 4/1995 | Bechter | 273/241 |
| 5,772,444 A | * | 6/1998 | DeFee | 434/300 |

OTHER PUBLICATIONS

Cybercut Hard Part Gallery, <http://cybercut.berkeley.edu/html/gallery_hard.htm>, Mar. 1999.*

* cited by examiner

*Primary Examiner*—Kurt Fernstrom
(74) *Attorney, Agent, or Firm*—Patrick J. Walsh

(57) ABSTRACT

An emblem in three-dimension representing the Tao law of polarity, specifically yang-yin.

5 Claims, 2 Drawing Sheets

YANG-YIN EMBLEM

BACKGROUND OF THE INVENTION

The present invention relates to Taoism and particularly to a three dimensional representation of the Taoist yang-yin principle.

Tao is the ultimate reality and energy of the universe, that from which nothing can deviate, the ground of being and non-being, a harmony of patterns which cannot exist without each other, and Tao signifies the order and course of nature. Tao is the course, the flow or the process of nature, that cannot be defined in words and is not merely an idea or concept. Tao may be attained but not seen, felt but not conceived, intuited but not categorized, and cannot be trapped in a network of words and numbers.

At the very base of Chinese intuition and thought resides the principle of polarity represented by the yang and the yin. The yang and the yin are ultimate polarities that are not explainable in other more fundamental terms, that are not separable and not additive, that are explicitly dual and intrinsically integrated such that where there is a yang there is a yin, and where there is a yin there is a yang. In traditional Chinese thought then the polarity principle comprehends unity as electricity with positive and negative poles, north and south, as aspects of the same system with negation of one of the poles being incomprehensible without destruction of the unity.

The law of polarity has been the subject of much thought among Chinese philosophers, who have deduced from this bipolar symbol a series of principles of unquestioned value including: (a) the quantity of energy distributed throughout the universe is invariable, (b) it consists of the sum of two equal amounts of energy, one positive and active in kind and the other negative and passive, and (c) the nature of cosmic phenomena is characterized by the varying proportions of the two modes of energy involved in their creation.

The principle of polarity is to be differentiated specifically from ideas of conflict such as light and darkness, good and evil, life and death, and conflict resolution by increasing one value while diminishing the other. The principle of polarity does not involve seeking yang and banishing yin, but is rather balancing the two.

The principle of polarity in Chinese culture is a manifestation of trust in nature and indeed in human nature, a realization that oneself and nature are the same, that is, the Tao.

The poles of cosmic energy are yang-yin, positive-negative, associated with being-nonbeing, masculine-feminine, exhalation-inhalation, on-off, sound-silence, impunity-punity, light-dark, before-after, high-low, long-short, heaven-earth, flourishing-diminishing, fortune-misfortune, growth-decay, easy-difficult, and so forth embracing all aspects of life and experience regardless of scale.

The conventional signs for yang and for yin are — and --, respectively, with the yang-yin polarity represented by one of eight trigrams shown in the conventional representation of yang-yin in FIG. 1 of the drawing, reproduced from A Dictionary of Symbols, by Juan E Cirlot.

As shown in FIG. 1, and as described by Cirlot, the interaction implicit in dualism is represented by the conventional and famous symbol of the yang-yin, a circle divided into two equal sections by a sigmoid line across the diameter, the white section, yang, having a black spot within it, and the black section, yin, a white spot. The two spots signify that there is always something of the feminine in the masculine, and something of the masculine in the feminine. The sigmoid line is a symbol of the movement of communication and implies rotation, thereby imparting a dynamic and complementary character to this bipartite symbol.

Taoists do not regard meditation as an "exercise" to alter, or to master any aspect of the universe by force or will power but rather as practice of Taoism as the art of being in harmony with nature, or to go along with the flow of things in an intelligent way. Meditation develops this intelligence, this sense of Tao, the intuitive realization of being one with Tao.

Contemplative Taoists sit in meditation, and meditate for the joy of meditation as a yin aspect of Taoist life, and when timely, the yang aspect of delighting in vigor.

The yang-yin symbol of FIG. 1, for example, allows for visual apprehension of the law of polarity, of black and white, and of something of the masculine in the feminine, and something of the feminine in the masculine. The sense of touch does not apprehend the law of polarity from the symbol as conventionally represented.

SUMMARY OF THE INVENTION

The present invention provides a three-dimensional representation of the yang-yin principle whereby the principle may be experienced through sight as well as touch, and wherein a three-dimensional representation in the form of a pendant, for example, serves as a constant reminder of the bipolar nature of cosmic energy, facilitates meditation of intuitive realization of being one with the Tao, sensing large and small manifestations of oneness with the Tao, and harmonizing the yang-yin energies in the body.

In a preferred form, the present invention comprises an emblem in three-dimension representing the law of polarity, specifically yang-yin.

The emblem comprises a disc of circular perimeter, an interior divided by a sigmoid line into equal sections representing yang and yin, a small circle in both the yang section and in the yin section, one face (obverse) of the emblem being characterized by the major portion of the yang being elevated above the emblem surface, and the major portion of the yin being depressed below the emblem surface, and with the reverse face of the emblem having corresponding major portions depressed and elevated in opposite relation to yang-yin of the obverse face.

The emblem through the senses of sight and touch presents to the consciousness a sense of the law of polarity as an aid in achieving oneness with the Tao both through meditation with the emblem and reflection on aspects of life and experience on any scale.

OBJECTS OF THE INVENTION

An object of the invention is to provide a Tao emblem.

Another object of the invention is to provide a Tao emblem with physical representation of the principle of yang-yin.

Another object of the invention is to provide a three dimensional yang-yin emblem wherein one face of a circular emblem is divided diametrically into equal sections by a sigmoid line, with major portions of the one face elevated to represent yang and depressed to represent yin, and with the reverse face of the emblem having a yin depression corresponding to the one face elevation, and having a yang elevation corresponding the yin depression of the one face.

Other and further objects of the invention will become apparent with an understanding of the following detailed description of the invention or upon employment of the invention in practice.

A preferred embodiment of the invention has been chosen for detailed description to enable those having ordinary skill in the art to which the invention appertains to readily understand how to construct and use the invention and is shown in the accompanying drawing in which.

DETAILED DESCRIPTION OF THE PREFERRED EMBODIMENT

Figure 1:
FIG. 1 is a standard depiction of Chinese yang-yin surrounded by the eight trigrams.
Figure 2:
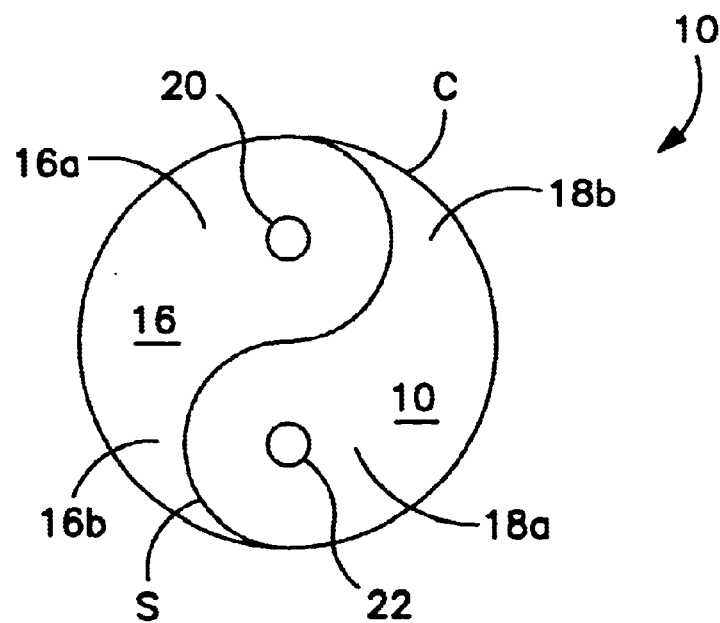
FIGS. 2 and 3 are plan views of a yang-yin emblem, according to the invention.
Figure 3:
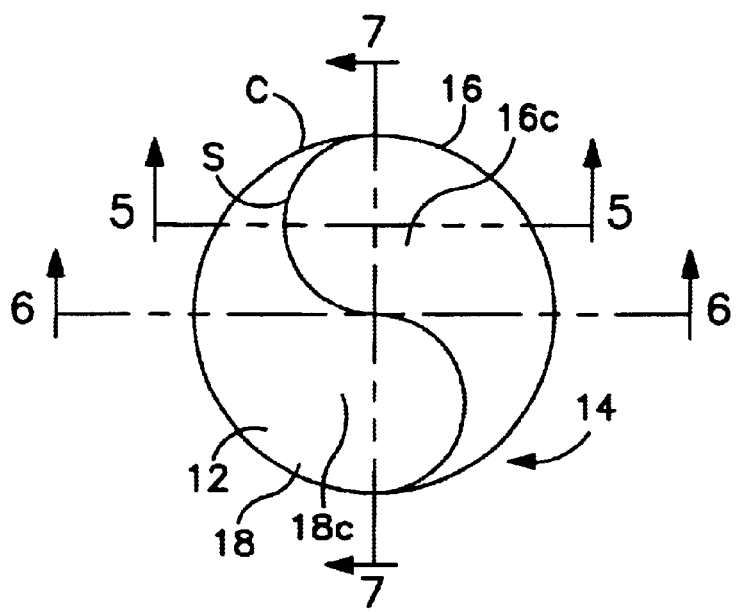
Figure 4:
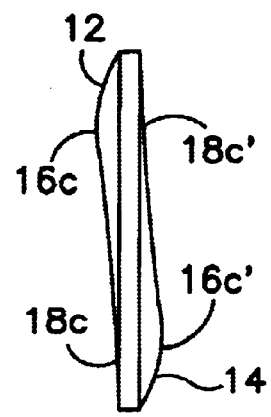
FIG. 4 is a side elevation thereof.
Figure 5:
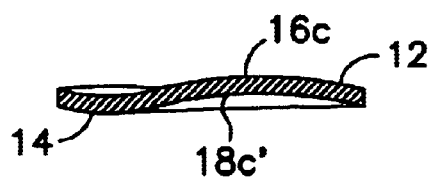
FIG. 5 is a section view taken through line 5—5 of FIG. 3.
Figure 6:
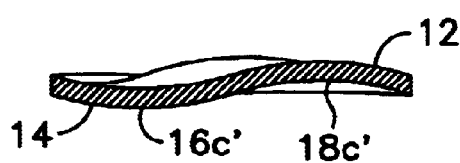
FIG. 6 is a section view taken through line 6—6 of FIG. 3.
Figure 7:
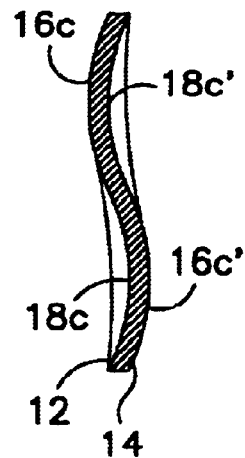
FIG. 7 is a section view taken through line 7—7 of FIG. 3.

Referring to the drawing, the yang-yin emblem comprises a disc 10 fabricated of a material normally employed for the manufacture of medallions and coins such as gold, copper, silver, bronze, aluminum and so forth. The disc has an outer circumference C with obverse 12 and reverse 14 faces with each face divided by a sigmoid (S shape) line S into substantially equal adjoining yang 16 and yin 18 sections. The obverse and reverse faces are mirror images. Small circles 20, 22 appear within the yang-yin sections to represent the feminine (yin) within the masculine (yang), and the masculine within the feminine. The yang-yin sections or forms 16, 18 as they appear in FIG. 2 have major portions 16a, 18a and minor portions 16b, 18b, respectively.

In accordance with the invention, the major portion of each of the yang and yin are displaced with respect to the obverse face 14 of the disc to form an elevated section 16c at the major portion of the yang form 16, and a depressed section 18c at the major portion of the yin form 18. Such displacements in the obverse face create opposite and identical displacements in the reverse face such that the elevated yang of the obverse face has directly underneath a depressed yin 18c' at the reverse face. Similarly, the obverse face yin depression has an opposite and identical yang elevation 16c' at the reverse face.

The obverse and reverse faces then have yang-yin forms with a major portion of yang form elevated to represent "high" for example, and a major portion of the yin form depressed to represent "low".

The law of polarity is sensed in meditation by sight or touch of the obverse or reverse yang-yin surfaces, as well as by sight or touch of the obverse yang/reverse yin counterparts.

The emblem enables reflection of the consciousness in evoking the realization of being at one with the Tao through sensing large and small manifestations of the law of polarity, in harmonizing the yang-yin energies of the body, in trust in nature and human nature, and in being in harmony with nature.

The emblem may be in the form of a medallion and kept as required for meditation, and may be in the form of a pendant as worn as an outward Tao sign available as a constant reminder of being at one with the Tao.

Various changes may be made to the structure embodying the principles of the invention. The foregoing embodiments are set forth in an illustrative and not in a limiting sense. The scope of the invention is defined by the claims appended hereto.

I claim:

1. A yang-yin emblem comprising a disc having an outer circumference and obverse and reverse faces, each face divided by a sigmoid line into substantially equal adjoining yang and yin forms each having a major portion and a minor portion, the major portion of the yang form being displaced with respect to the obverse face of the disc to form an elevated section, the major portion of the yin form being displaced with respect to the obverse face to form a depressed section, the reverse face yang form and yin form having opposite and identical displacements such that the elevated yang of the obverse face has directly underneath a depressed yin at the reverse face, and the obverse face yin depression has an opposite and identical yang elevation at the reverse face.

2. A yang-yin emblem as defined in claim 1 in which the yang forms of both the obverse and reverse faces have a small circle therein to represent the yin within the yang, and the yin forms of both faces have a small circle therein to represent the yang within the yin.

3. A yang-yin emblem as defined in claim 1 fabricated of a metal selected from the group consisting of gold, silver, bronze, copper, and aluminum.

4. A yang-yin emblem comprising a base having an outer perimeter and obverse and reverse faces, each face divided by a line into substantially equal adjoining yang and yin forms each having a major portion and a minor portion, the major portion of the yang form having an elevated section, the major portion of the yin form having a depressed section, the elevated yang of the obverse face having directly underneath a depressed yin at the reverse face, and the obverse face yin depression having directly underneath a yang elevation at the reverse face.

5. A Tao emblem comprising a disc having obverse and reverse faces, each face divided by an S shape line into substantially equal adjoining yang and yin forms each having a major portion and a minor portion, the major portion of the yang form of the obverse face having an elevated section, the major portion of the yin form of the obverse face having a depressed section, the elevated yang of the obverse face having directly underneath a depressed yin at the reverse face, and the obverse face yin depression having directly underneath a yang elevation at the reverse face, and a small circle in each of the yang-yin forms of both the obverse and reverse faces.

* * * * *